US008351406B2

(12) United States Patent
Trainin et al.

(10) Patent No.: US 8,351,406 B2
(45) Date of Patent: Jan. 8, 2013

(54) TECHNIQUES FOR DYNAMIC RESOURCE ALLOCATION (75) Inventors: Solomon Trainin, Haifa (IL); Herbert Liondas, Zichron Yaakov (IL)

(73) Assignee: Intel Corporation, Santa Clara, CA (US)

(*) Notice: Subject to any disclaimer, the term of this patent is extended or adjusted under 35 U.S.C. 154(b) by 320 days.

(21) Appl. No.: 12/653,931

(22) Filed: Dec. 21, 2009

(65) Prior Publication Data
US 2011/0149924 A1    Jun. 23, 2011

(51) Int. Cl.
H04J 3/00 (2006.01)
H04B 7/212 (2006.01)
H04W 72/00 (2009.01)

(52) U.S. Cl. ............... 370/337; 370/347; 455/452.2

(58) Field of Classification Search .......... 370/458–461, 370/465–468, 473–474, 338, 328–330, 395.21–395.43; 455/450, 452.1–452.2, 453
See application file for complete search history.

(56) References Cited

U.S. PATENT DOCUMENTS

| | | | |
|---|---|---|---|
| 6,233,466 B1 | 5/2001 | Wong et al. |
| 6,745,038 B2 | 6/2004 | Callaway, Jr. et al. |
| 6,823,186 B2 | 11/2004 | Salokannel et al. |
| 6,973,335 B2 | 12/2005 | Ganton |
| 7,006,530 B2 | 2/2006 | Spinar et al. |
| 7,110,380 B2 | 9/2006 | Shvodian |
| 7,113,536 B2 | 9/2006 | Alriksson et al. |
| 7,146,164 B2 | 12/2006 | Hunzinger |
| 7,245,947 B2 | 7/2007 | Salokannel et al. |
| 7,257,326 B2 * | 8/2007 | Song et al. ............ 398/99 |
| 7,433,697 B2 | 10/2008 | Karaoguz et al. |
| 7,453,832 B2 | 11/2008 | Steer et al. |
| 7,460,834 B2 | 12/2008 | Johnson et al. |
| 7,463,886 B2 | 12/2008 | Salokannel et al. |
| 7,548,552 B2 | 6/2009 | Shvodian et al. |
| 7,672,382 B2 | 3/2010 | Yoshida et al. |
| 7,809,835 B2 | 10/2010 | Reunamaki et al. |
| 7,822,000 B2 | 10/2010 | Sekhar |
| 7,890,116 B2 | 2/2011 | Salokannel et al. |

(Continued)

FOREIGN PATENT DOCUMENTS

KR    10-2000-0045261 A    7/2000

(Continued)

OTHER PUBLICATIONS

International Search report and Written Opinion received for PCT Patent Application No. PCT/US2010/055473, mailed on Jun. 30, 2011, 9 pages.

(Continued)

*Primary Examiner* — Thai Hoang
(74) *Attorney, Agent, or Firm* — Sutherland Asbill & Brennan LLP (57) ABSTRACT Techniques are disclosed that dynamically allocate communications resources in a wireless communications network, such as a wireless personal area network (WPAN). For instance, a wireless communications device may obtain a resource allocation. This resource allocation includes a time slot (e.g., a TDMA time slot) within a wireless communications medium. The device determines a first portion of the time slot in which it intends to transmit data. Also, the wireless communications device relinquishes a second portion of the time slot that occurs after the first portion of the time slot. Based on this relinquishment, a central controller device may reallocate the second portion of the time slot.

14 Claims, 7 Drawing Sheets

U.S. PATENT DOCUMENTS

| | | |
|---|---|---|
| 2003/0214969 A1* | 11/2003 | Cain et al. ............. 370/443 |
| 2004/0028018 A1* | 2/2004 | Cain ..................... 370/338 |
| 2004/0196822 A1 | 10/2004 | Proctor |
| 2005/0002362 A1 | 1/2005 | Kim et al. |
| 2005/0002372 A1 | 1/2005 | Rune et al. |
| 2005/0075142 A1 | 4/2005 | Hoffmann et al. |
| 2005/0180385 A1 | 8/2005 | Jeong et al. |
| 2006/0164969 A1 | 7/2006 | Malik et al. |
| 2007/0002809 A1 | 1/2007 | Reunamaki et al. |
| 2007/0019605 A1* | 1/2007 | Rioux et al. ............. 370/347 |
| 2007/0047503 A1* | 3/2007 | Gonorovsky et al. ...... 370/337 |
| 2007/0060160 A1 | 3/2007 | Hur et al. |
| 2007/0280184 A1 | 12/2007 | Shin et al. |
| 2008/0080460 A1* | 4/2008 | Ramkumar et al. ........ 370/342 |
| 2008/0233875 A1 | 9/2008 | Desai et al. |
| 2009/0232112 A1 | 9/2009 | Trainin et al. |
| 2009/0253438 A1 | 10/2009 | Chater-Lea et al. |
| 2011/0170559 A1* | 7/2011 | Zhang et al. ............ 370/442 |

FOREIGN PATENT DOCUMENTS

| | | |
|---|---|---|
| KR | 20000045261 A1 | 7/2000 |
| KR | 10-2007-0116536 A | 12/2007 |
| KR | 20070116536 A | 12/2007 |
| WO | 2009/114518 A2 | 9/2009 |
| WO | 2009/114518 A3 | 12/2009 |
| WO | 2011/084225 A2 | 7/2011 |
| WO | 2011/084225 A3 | 10/2011 |

OTHER PUBLICATIONS

Office Action received for Chinese Patent Application No. 200910149725.6, mailed Nov. 1, 2011, 23 pages.

International Search Report and Written Opinion received for PCT Patent Application No. PCT/US2009/036645, mailed on Oct. 22, 2009, 12 pages.

International Preliminary Report on Patentability and Written Opinion received for PCT Patent Application No. PCT/US2009/036645, mailed on Sep. 23, 2010, 6 pages.

International Preliminary Report on Patentability and Written Opinion received for PCT Patent Application No. PCT/US2010/055473, mailed on Jul. 5, 2012, 7 pages.

* cited by examiner

TECHNIQUES FOR DYNAMIC RESOURCE ALLOCATION

BACKGROUND

Wireless communications capabilities are increasingly being integrated into portable devices, including laptop computers, handheld devices (such as personal digital assistants (PDAs)), and mobile phones. The integration of such capabilities can provide users with anywhere and anytime connectivity to information resources.

Many communications systems include a central controller device that manages available network bandwidth. For example, wireless personal area networks (WPANs) may include a piconet controller device (PNC) that allocates resources for multiple wireless communications devices (DEVs). Such WPANs may operate at various frequencies. For example, organizations such as the Wireless Gigabit Alliance (WiGig) promote the development of WPANs in which devices exchange millimeter wave signals at a 60 gigahertz (GHz) frequency range. Such signals may convey data at very high rates. Thus, these networks may support high data rate (HDR) applications, such as high definition television (HDTV).

Time division multiple access (TDMA) is a resource allocation technique for shared medium networks. TDMA allows multiple devices to share a frequency channel by dividing a time period (such as a superframe) into multiple time slots. For instance, multiple devices may be allocated corresponding (non-overlapping) time slots to transmit data. As a result, multiple devices may send transmissions that do not collide (interfere) with each other.

Devices may have time varying resource needs. For instance, certain applications (such as compressed video, telephony, and so forth) produce traffic having variable bit rates (VBRs). Conventional resource allocation techniques may allocate a resource to a device so that the device's maximum resource needs can always be met. Unfortunately, this approach is wasteful. This is because, for most of the time, the device's varying resource needs are well below its allocated amount.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for dynamic resource allocation in a wireless network. For instance, a wireless communications device may obtain a resource allocation. This resource allocation includes a time slot (e.g., a TDMA time slot) within a wireless communications medium. The device determines a first portion of the time slot in which it intends to transmit data. Also, the wireless communications device relinquishes a second portion of the time slot that occurs after the first portion of the time slot. Based on this relinquishment, a central controller device may reallocate the second portion of the time slot.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
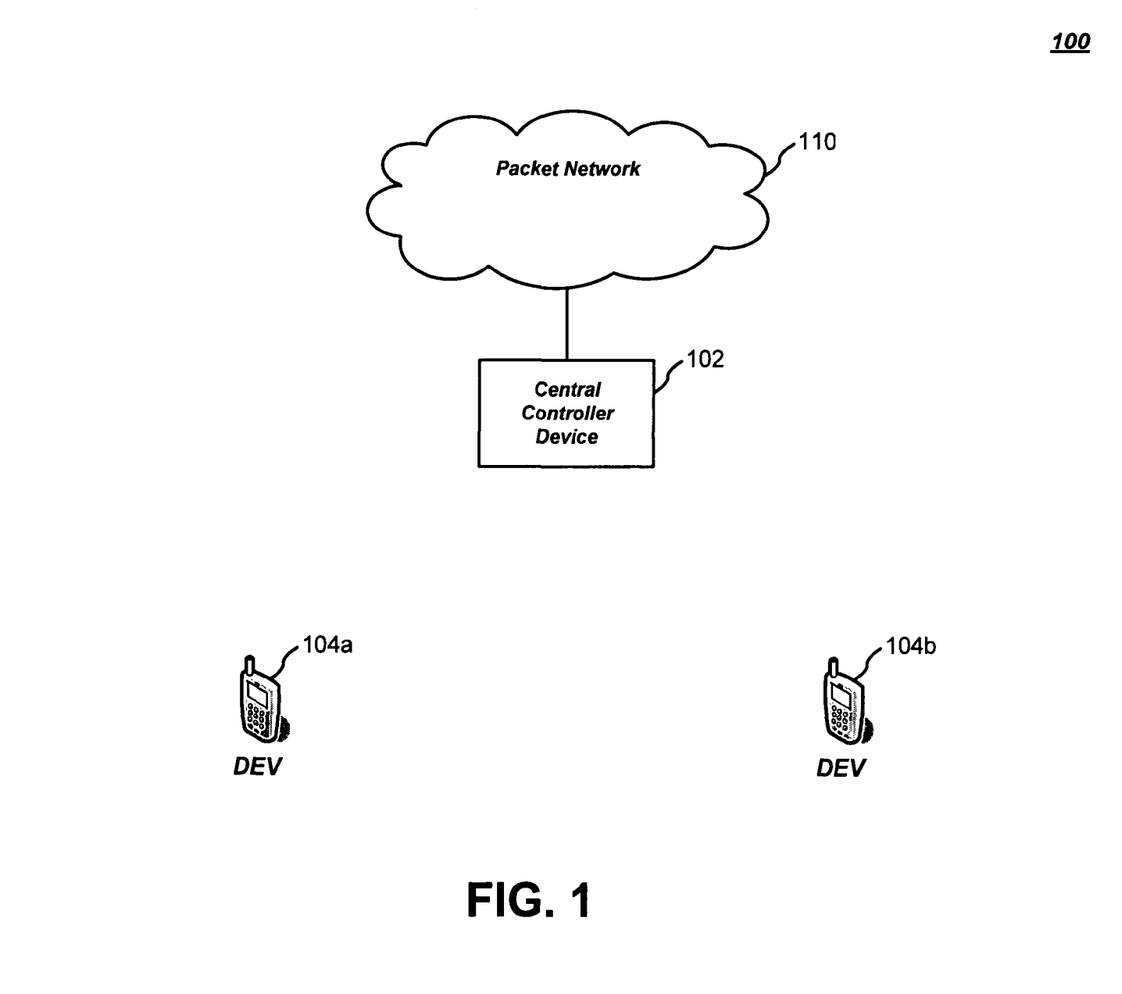
FIG. 1 is a diagram of an exemplary operational environment.

FIG. 1 is a diagram of an exemplary operational environment 100 in which the techniques described herein may be employed. As shown in FIG. 1, this environment includes a central controller device 102 and multiple devices (DEVs) 104a-b. These elements may each be implemented in any combination of hardware and/or software.

Central controller device 102 provides a DEVs 104a-b with mobile communications capabilities. For example, central controller device 102 may operate as a hub through which DEVs 102a-b may communicate with each other. Also, central controller device 102 may provide DEVs 102a-b with access to a packet network (such as the Internet). Accordingly, FIG. 1 shows central controller device 102 coupled to such a packet network 110.

Moreover, central controller device 102 may control access to a wireless communications resource (such as one or more frequency channels or bands). For instance, central controller device 102 may control the allocation of time slots in accordance with a TDMA allocation scheme. This may involve central controller device 102 receiving resource requests from DEVs 104a-b, and granting corresponding time slots within a TDMA frame format.

DEVs 104a-b may each be implemented as various types of devices. Exemplary devices include mobile telephones, smartphones, wireless personal digital assistants (PDAs), mobile internet devices (MIDs), notebook computers, netbooks, nettops, and so forth. Embodiments are not limited to these examples.

DEVs 104a-b (as well as central controller device 102) may communicate wirelessly with each other. Such communications may be ether through direct links or through central controller device 102. Thus, the devices of FIG. 1 may form a WPAN in which central controller device 102 operates as a PNC. Such communications involve the exchange of wireless signals that may be at various frequency ranges. For example, in embodiments, these signals are millimeter wave signals at a 60 GHz frequency range.

Each of devices 104a-b is associated with central controller device 102. Moreover, devices 104a-b and central controller device 102 may each have directional antenna (e.g., beamforming) capabilities. Thus, the devices of FIG. 1 may be trained to use directed signal transmissions and signal receptions with each other When higher frequencies (such as 60 GHz) are employed, greater signal propagation losses occur. Thus, such directional antenna features may advantageously handle these losses and achieve substantial wireless communications ranges for the transmission of data at very high data rates (e.g., at rates greater than 1 gigabit per second). Thus, embodiments may exchange data corresponding to high data rate applications, such as uncompressed HDTV (as well as other applications).

Figure 2:
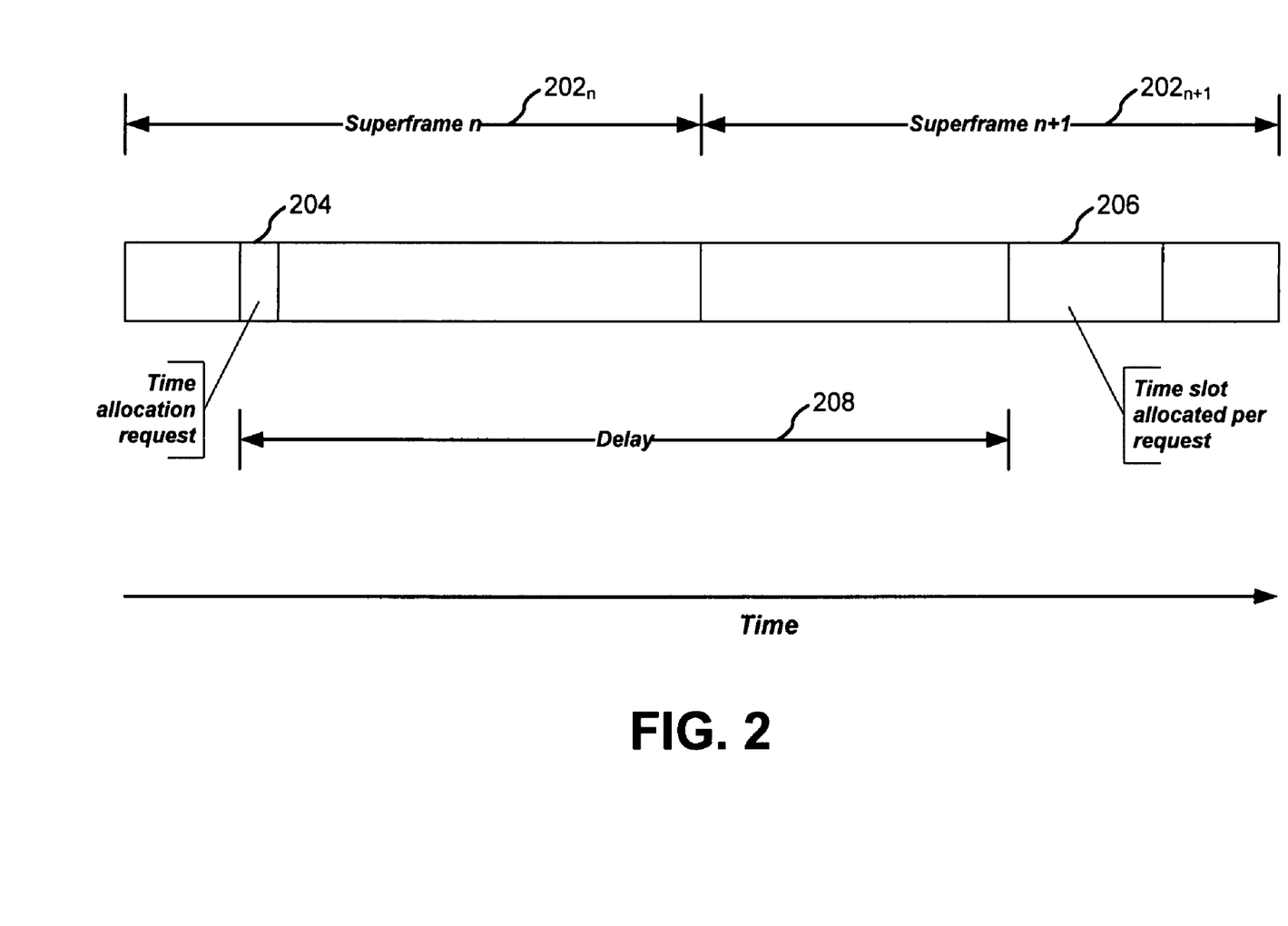
FIG. 2 is a diagram of an exemplary time allocation.

In embodiments, transmissions by the devices in FIG. 1 are each based on a repeating pattern called a superframe. FIG. 2 is a diagram showing an exemplary superframe format. In particular, FIG. 2 shows a frame format that includes consecutive superframes $202_n$ and $202_{n+1}$.

This superframe format provides for wireless transmission according to a TDMA resource allocation scheme that allocates time slots for devices to send their transmissions. These time slots may be allocated in response to individual device requests. For instance, FIG. 2 shows a time allocation request 204 being transmitted in superframe $202_n$. This request is transmitted from a device to a central controller device. For example, in the context of FIG. 1, request 204 may be sent from DEV 104a or DEV 104b to central controller device 102.

Upon receipt of this request, the central controller device may allocate a corresponding time slot to the requesting device. In particular, FIG. 2 shows an allocated time slot 206 in superframe $202_{n+1}$. During this time slot, the requesting device may send its transmissions. In embodiments, this allocation may be indicated in a beacon transmitted by the central controller device. Embodiments, however, may employ other indication techniques.

A drawback of TDMA is that it may be slow in allocating time slots. More particularly, a device requesting an allocation (or to change an existing allocation) may have to wait approximately one superframe. For example, FIG. 2 shows that a delay 208 occurs between request 206 and the corresponding allocation 208. Thus, TDMA allocation can be inefficient.

While conventional TDMA may be satisfactory for devices needing a constant bit-rate (CBR) data transfer, it is often inadequate for variable bit rate (VBR) applications. For instance, VBR applications, such ones employing compressed bit-streams, do not offer transmitting devices with a priori knowledge regarding how much data is available for each of its allocated time slots.

As discussed above, an approach to guaranteeing sufficient transmission capacity for a device involves a central controller device (e.g., a PNC) providing a maximal allocation. In particular, this maximal allocation provides the device with a time slot large enough for the device to transmit the maximum possible number of bits that it can. Unfortunately, devices would typically use only a fraction (e.g., one-half or one-tenth) of such a maximally allocated slot. Thus, this approach wastes bandwidth that could be used by other devices. Such other devices may include devices that do not have pre-allocated time slots, but need to transfer data from time to time.

Another approach to guaranteeing sufficient transmission capacity for a device involves dividing a maximally allocated slot into several smaller mini-slots. In this approach, a VBR device stops at the end of each mini-slot and asks the central controlling device to continue using the next mini-slot. This procedure may be performed until all of the device's available data (e.g., all of its buffered data) has been sent. However, with this approach, the involved devices (e.g., the PNC, the VBR device, and any other devices requesting allocations) would unfortunately be involved in a tedious handshake. Moreover, such a handshake would need to be resolved in a relatively short amount of time. Thus, this approach may be complicated, power consuming, and prohibitive for handheld devices.

Figure 3:
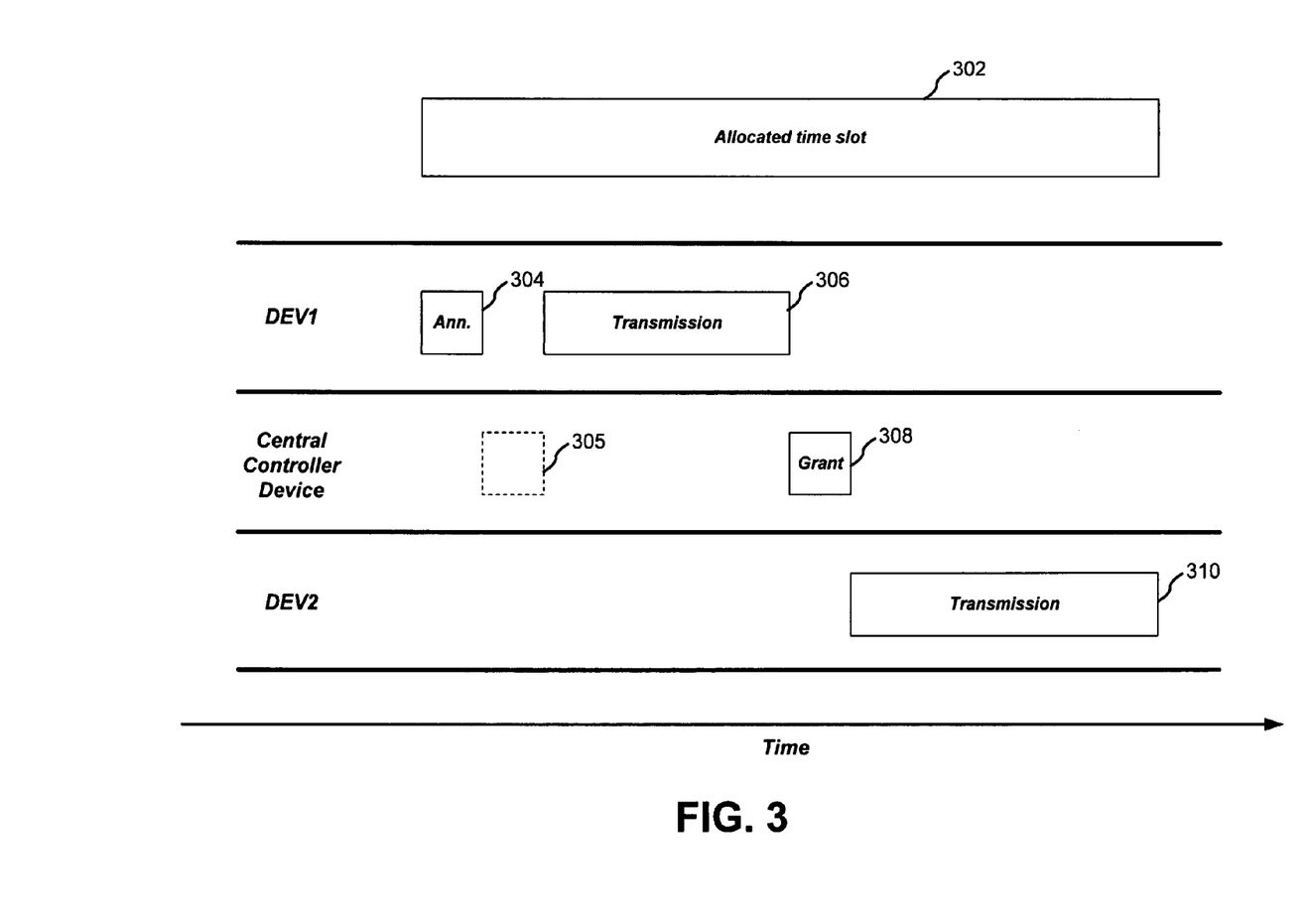
FIG. 3 is a diagram showing a technique of dynamic slot allocation with early announcement.

Embodiments may provide sufficient transmission capacity through an approach that involves dynamic allocation with early announcement. FIG. 3 is a diagram showing an example of this approach. In particular, this diagram shows a time slot 302, which is allocated to a first wireless communications device (DEV1). This time slot was allocated by a central controller device (such as a PNC).

Various intervals (or portions) exist within time slot 302. For instance, FIG. 3 shows an announcement 304 that is sent by DEV1. Announcement 304 indicates a portion of time slot 302 that DEV1 intends to transmit, as well as a portion of time slot 302 that DEV1 has relinquished.

In embodiments, announcement 304 may include various information. For example, announcement 304 may include a duration of a time interval (which starts at the end of announcement 304) during which DEV1 intends to transmit data. In FIG. 3, a block 305 shows reception of announcement portion 304 by the central controller device.

As described herein, a wireless communications device may retain a portion of its time slot to transmit its available data. For instance, FIG. 3 shows a first transmission portion 306 that DEV1 utilizes to transmit data.

FIG. 3 shows that a grant 308 follows first transmission portion 306. Grant 308 (which is transmitted by the central controller device) indicates how the remainder of time slot 302 is to be allocated. For example, in FIG. 3, grant 308 indicates that a second wireless communications device (DEV2) has been allocated the remainder of time slot 302. Accordingly, FIG. 3 shows a second transmission portion 310 (e.g., the remainder of time slot 302) that DEV2 uses to transmit data.

Alternatively, grant 308 may be transmitted earlier. For example, when directed antenna patterns (e.g., beamforming patterns) are employed, the central controller device may send grant 308 to DEV2 while DEV1 is transmitting first transmission portion 306. This is because such beamforming patterns may allow grant 308 to not interfere with first transmission portion 306. This may advantageously cause power savings by the central controller device.

FIGS. 4A-4E are diagrams showing an exemplary sequence of interactions among multiple devices. These devices include a PNC and four other wireless communications device (shown as DEV1-DEV4). Also, these diagrams show exemplary directional antenna patterns.

Figure 4A:
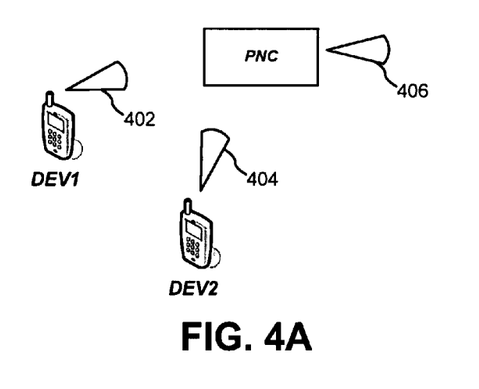
FIGS. 4A-4E are diagrams showing interactions among multiple devices.

FIG. 4A shows a steady state in which unengaged devices DEV1 and DEV2 are listening to the PNC. Also, FIG. 4A shows directional antenna patterns employed by these devices. For instance, DEV1 and DEV2 have receive antenna patterns 402 and 404, respectively. These patterns are directed towards the PNC. Also the PNC has a receive antenna pattern 406, which is pointed away from DEV1 and DEV2, and towards another device (not shown).

Figure 4B:
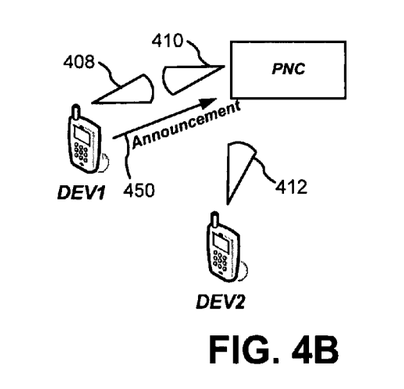

FIGS. 4B-E illustrate different interactions during a time slot that is allocated to DEV1. For instance, FIG. 4B shows DEV1 having a transmit/receive antenna pattern 408 that is directed to the PNC. Likewise, the PNC has a transmit/receive antenna pattern 410 that is directed towards DEV1. Through these patterns, DEV1 sends an announcement 450 to the PNC. As described herein, this announcement indicates a portion of the allocated time slot that DEV1 intends to utilize for data transmission. Also, FIG. 4B shows DEV2 having an receive antenna pattern 412 that is directed towards the PNC.

Figure 4C:
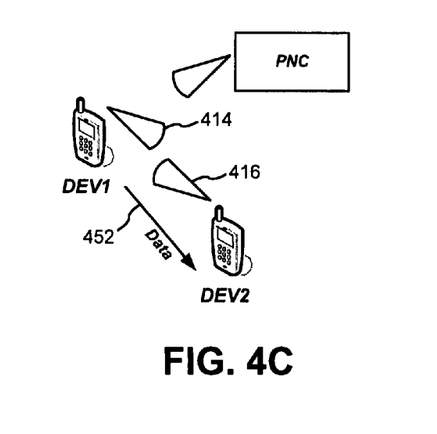

In FIG. 4C, DEV1 is shown sending a data transmission 452 to DEV2. Accordingly, FIG. 4C shows DEV1 having a transmit/receive antenna pattern 414 that is directed towards DEV2. Likewise, FIG. 4C shows DEV2 having a receive antenna pattern 416 that is directed towards DEV1.

Figure 4D:
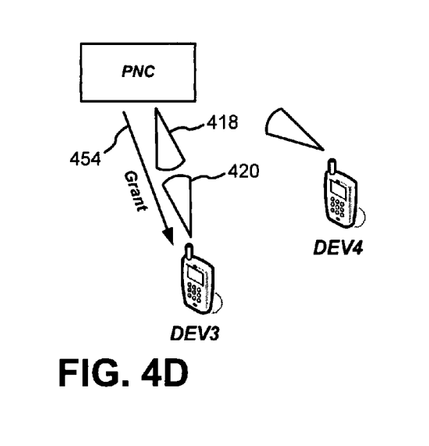

Following this data transmission, FIG. 4D shows the PNC sending a grant message 454 to DEV3. This grant message allocates the remainder of DEV1's time slot to DEV3. Thus, FIG. 4D also shows the PNC having a transmit antenna pattern 418 directed towards DEV3, and DEV3 having a receive antenna pattern 420 that is directed to the PNC.

Figure 4E:
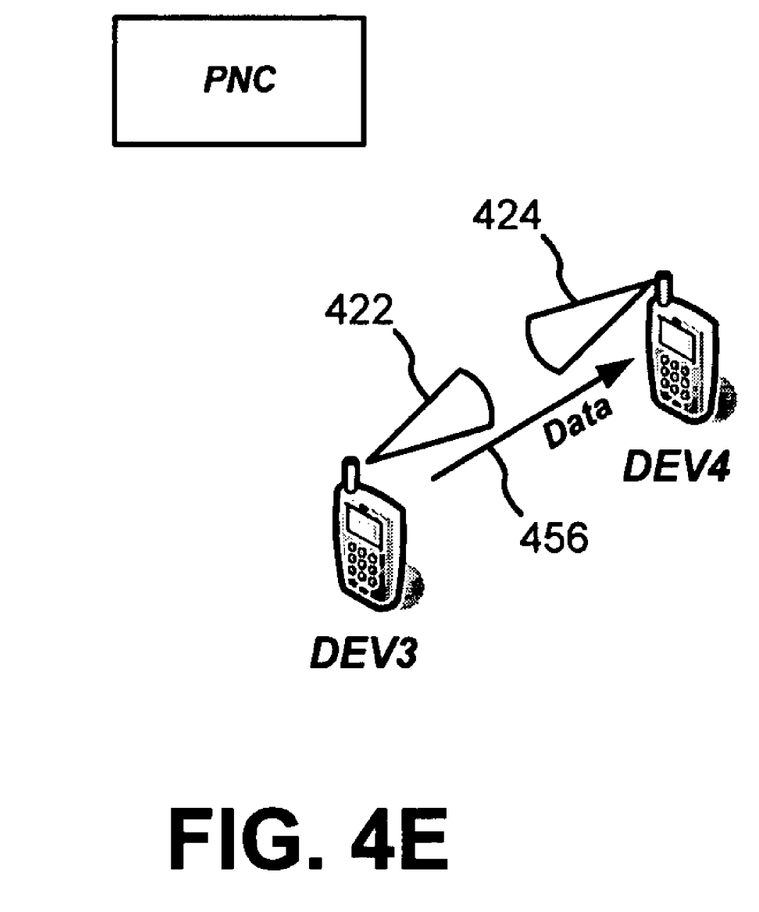

Based on grant message 454, FIG. 4E shows DEV3 sending a data transmission 456 to DEV 4. Furthermore, FIG. 4E shows DEV3 having a transmit antenna pattern 422 that is directed towards DEV4, and DEV4 having a receive antenna pattern 424 that is directed towards DEV3.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 5:
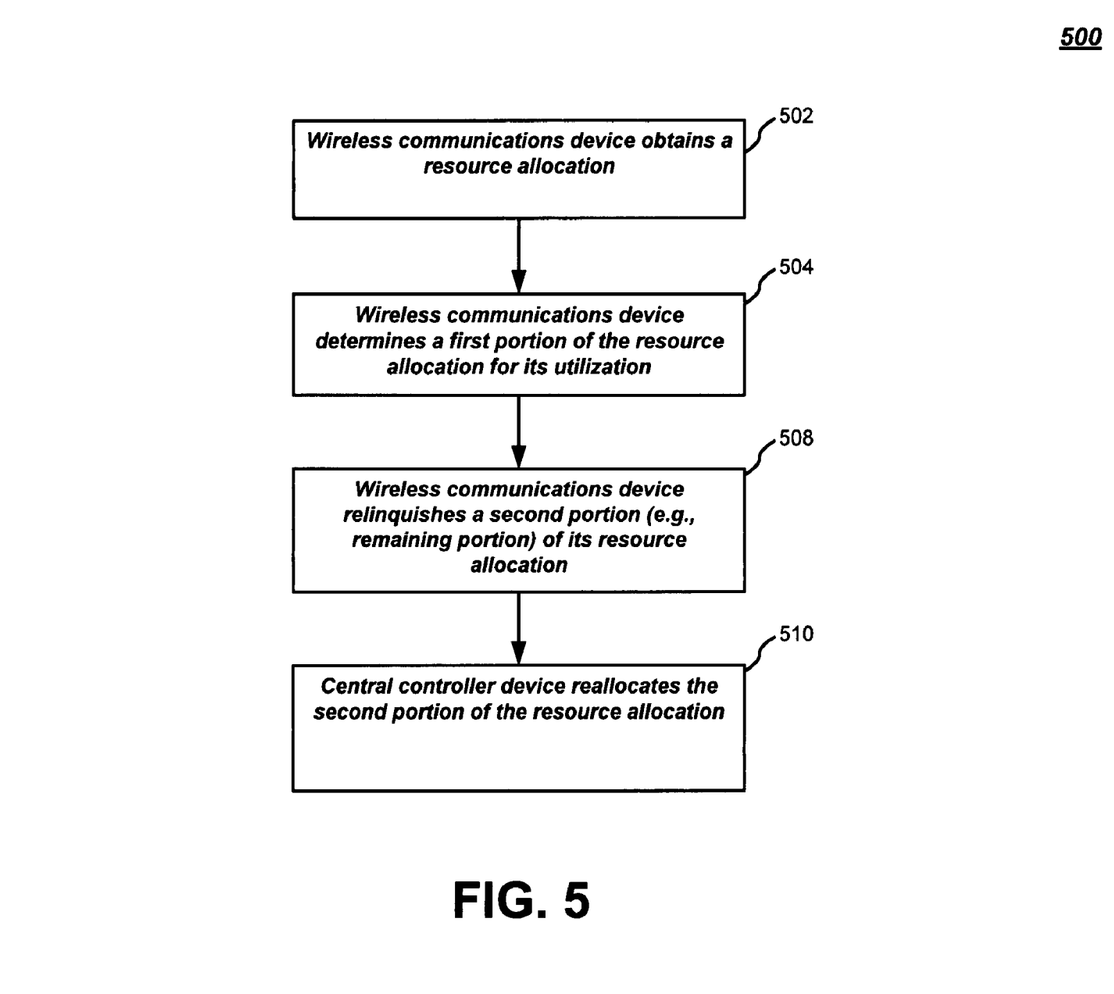
FIG. 5 is a logic flow diagram.

FIG. 5 illustrates an exemplary logic flow 500, which may be representative of the operations executed by one or more embodiments described herein. The logic flow of FIG. 5 is described in the context of a wireless communications device (e.g., a DEV) and a central controller device (e.g., a PNC). Thus, this flow may be employed in the contexts of FIGS. 1-4E. Embodiments, however, are not limited to these contexts. Also, although FIG. 5 shows particular sequences, other sequences may be employed. Moreover, the depicted operations may be performed in various parallel and/or sequential combinations.

At a block 502, the wireless communications device obtains a resource allocation from the central controller device. This resource allocation may include a time slot (e.g., a TDMA slot) within a wireless communications medium. In embodiments, block 502 may comprise the wireless communications device obtaining the resource allocation (e.g., DEV1) by sending a request message to the central controller device (PNC). In response, the central controller device sends a broadcast transmission that includes the resource allocation slots of all devices (like DEV1 & DEV2) that may be used by VBR traffic and therefore candidates for other devices (like DEV3 & DEV4) to use the remaining non-used portions. This transmission may be a beacon. However, embodiments may employ other forms of broadcast and/or point-to-point transmissions.

When such candidate allocated time slot (302) arrives, the directed antenna of each device (like DEV3 & DEV4) is directed to the PNC to be ready to get the grant that allows using remaining time of the slot or to reuse any part of the slot.

In block 504, At start of the slot the directed antenna of the PNC is directed to the device (DEV1) what is owner of the slot (FIG. 4B). Then device (DEV1) directs it's antennas to the PNC and sends to PNC announcement that includes the duration that the device is going to utilize in the current slot. This may involve, for example, the wireless communications device determining the amount of data it has in a transmission buffer (e.g., an encoder output buffer).

At a block 508, the wireless communications device relinquishes a second portion (the remaining portion) of its resource allocation. This second portion of the time slot occurs after the first portion of the time slot.

Upon receipt of the relinquishment (e.g., the announcement message), the central controller device reallocates the second portion of the resource allocation at a block 510. This may involve granting the second portion to one or more other wireless communications devices (e.g., other DEV(s)). Alternatively, this may involve the central controller device retaining the second portion of the resource allocation for its own use (e.g., for its own data transmission).

The central controller device may employ various techniques for reallocating the second portion. For instance, in embodiments, the central controller device may employ a polling mechanism that requests whether other wireless communications device(s) have data to transmit. If so, then the central controller device sends a grant to such a device. Upon receipt of this grant, the wireless communications device may transmit its data within the second portion of the time slot.

Figure 6:
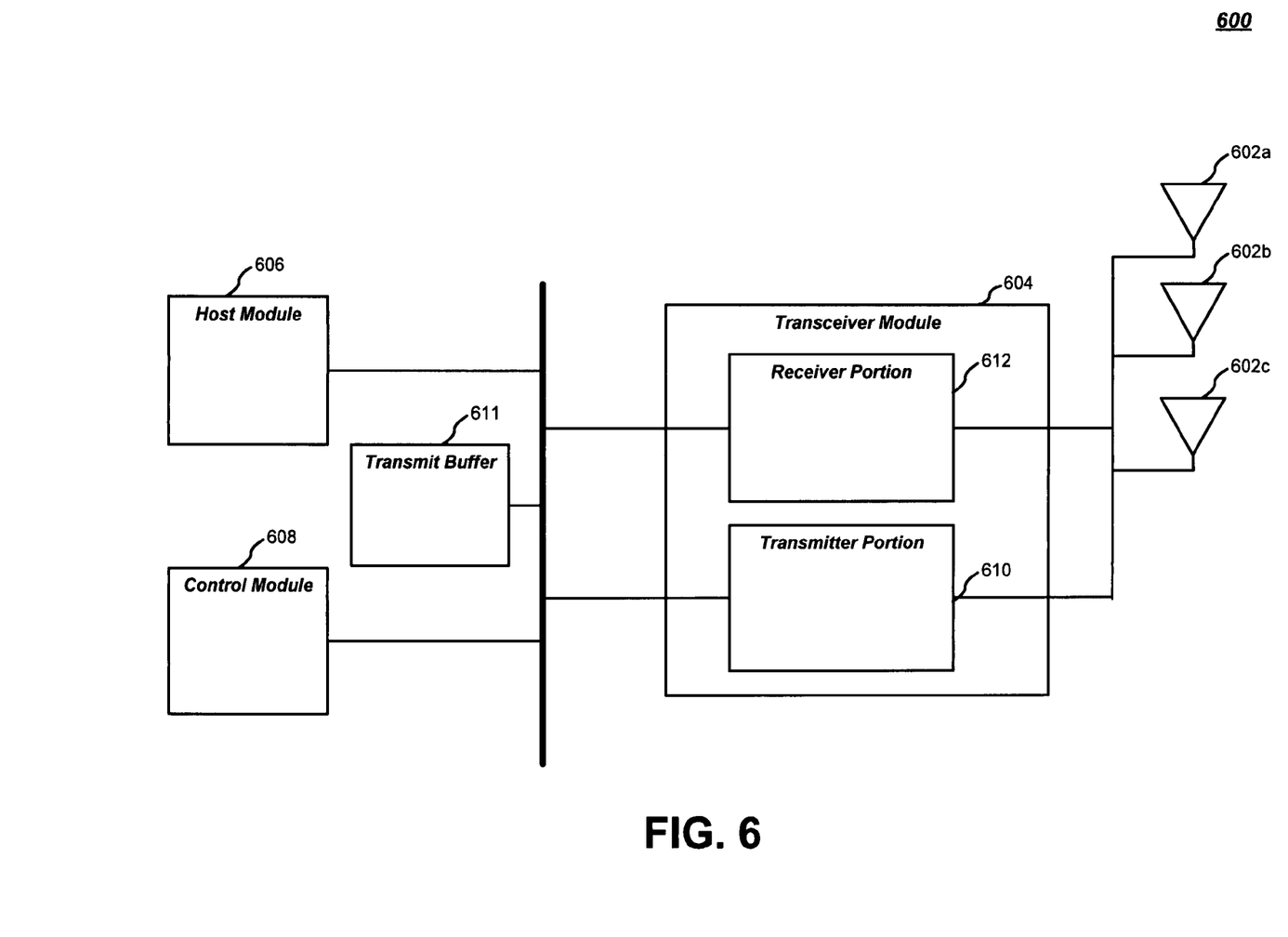
FIG. 6 is a diagram of an exemplary implementation.

FIG. 6 is a diagram of an implementation 600 that may be included in a wireless communications device, such as a DEV (e.g., DEVs 104a and 104b) and/or central controller devices (e.g., central controller device 102). Implementation 600 may include various elements. For example, FIG. 6 shows implementation 600 including multiple antennas 602a-c, a transceiver module 604, a host module 606, a control module 608, and a transmit buffer 611. These elements may be implemented in hardware, software, or any combination thereof.

Antennas 602a-c provide for the exchange of wireless signals with remote devices. Although three antennas are depicted, any number of antennas may be employed. Also, embodiments may employ one or more transmit antennas and one or more receive antennas. Such multiple antenna arrangements may be employed for beamforming and/or the employment of multiple spatial streams with a remote device.

Transceiver module 604 provides for the exchange of information with other devices. As shown in FIG. 6, transceiver module 604 includes a transmitter portion 610, and a receiver portion 612. During operation, transceiver module 604 provides an interface between antennas 602a-c and other elements, such as host module 606, control module 608, and transmit buffer 611. For instance, transmitter portion 610 receives symbols from such elements, and generates corresponding signals for wireless transmission by one or more of antennas 602a-c. This may involve operations, such as modulation, amplification, and/or filtering. However, other operations may be employed.

Conversely, receiver portion 612 obtains signals received by one or more of antennas 602a-c and generates corresponding symbols. In turn, these symbols may be provided to elements, such as host module 606 and control module 608. This generation of symbols may involve operations, including (but not limited to) demodulation, amplification, and/or filtering.

The signals generated and received by transceiver module 604 may be in various formats. For instance, these signals may be modulated in accordance with an orthogonal frequency division multiplexing (OFDM) scheme. However, other schemes and formats (e.g., QPSK, BPSK, FSK, etc.) may be employed.

To provide such features, transmitter portion 610 and receiver portion 612 may each include various components, such as modulators, demodulators, amplifiers, filters, upconverters, and/or downconverters. Such components may be implemented in hardware (e.g., electronics), software, or any combination thereof.

The symbols exchanged between transceiver module 604 and other elements may form messages or information associated with one or more protocols, and/or with one or more user applications. Thus, these elements may perform operations corresponding to such protocol(s) and/or user application(s). Exemplary protocols include (but are not limited to) various media access control and discovery protocols. Exemplary user applications include telephony, messaging, e-mail, web browsing, content (e.g., video and audio) distribution/reception, and so forth.

Moreover, in transmitting signals, transceiver module 604 may employ various access techniques. For example, transceiver module 604 may operate in accordance with a TDMA technique. Embodiments, however, are not limited to such techniques.

In embodiments, control module 608 may perform various operations described herein. For instance, control module 608 may generate, receive, and process various resource allocation messages, as described herein. Such messages may include resource allocation requests, allocation indications (e.g., conveyed in beacons), announcement messages, and grant messages. Moreover, control module 608 may determine the amount of available data in transmission buffer 611.

Transmission buffer 611 stores data that is ready for wireless transmission. Such data may be encoded and/or compressed data associated with one or more applications (e.g., VBR applications). In embodiments, transmission buffer 611 includes a storage medium (e.g., memory). Also, transmission buffer 611 may be arranged as a first-in, first-out (FIFO) buffer.

Host module 606 may exchange symbols with transceiver module 604 (e.g., through transmission buffer 611) that correspond to wireless signals exchanged with remote devices. These symbols may form messages or information associated with one or more protocols, and/or one or more user applications. Thus, host module 606 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The storage medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the techniques described herein are not limited to WPANs.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
obtaining a resource allocation for a wireless communications device, the resource allocation comprising a time slot within a wireless communications medium;
determining a first portion of the time slot, the first portion for the wireless communications device to transmit data; and
relinquishing a second portion of the time slot, wherein the second portion of the time slot occurs after the first portion of the time slot,
wherein relinquishing the second portion of the time slot comprises sending an announcement message to a remote device.

2. The method of claim 1, wherein determining the first portion of the time slot comprises determining an amount of available transmission data stored by the wireless communications device.

3. The method of claim 1, wherein the announcement message precedes the first portion of the time slot.

4. The method of claim 1, wherein the announcement message includes a duration corresponding to the first portion of the time slot.

5. The method of claim 1, wherein obtaining the resource allocation comprises:
sending a request to a remote device; and
receiving a beacon transmission from the remote device.

6. The method of claim 1, wherein the time slot is within a time division multiple access (TDMA) frame.

7. An apparatus, comprising:
a transceiver to exchange wireless signals with a remote device;
a transmission buffer to store available data, the available data for transmission by the transceiver module;
a control module, wherein the control module is to determine a first portion of an allocated time slot for transmitting the available data, and to relinquish a second portion of the time slot, wherein the second portion of the time slot occurs after the first portion of the time slot, wherein relinquishing the second portion of the time slot comprises sending, an announcement messaue to a remote device.

8. The apparatus of claim 7, wherein the control module is to:
generate a request for the allocated time slot; and
receive an allocation of the allocated time slot that is originated by a remote central controller device.

9. The apparatus of claim 7, wherein the allocated time slot is within a time division multiple access (TDMA) frame.

10. The apparatus of claim 7, further comprising one or more antennas to provide directional beamforming.

11. The apparatus of claim 7, wherein the wireless signals are millimeter wave signals.

12. The apparatus of claim 7, wherein the available data is associated with a variable bit rate (VBR) application.

13. An article comprising a non-transitory machine-accessible medium having stored thereon instructions that, when executed by a machine, cause the machine to:
obtain a resource allocation for a wireless communications device, the resource allocation comprising a time slot within a wireless communications medium;
determine a first portion of the time slot, the first portion for the wireless communications device to transmit data; and
relinquish a second portion of the time slot, wherein the second portion of the time slot occurs after the first portion of the time slot, wherein relinquishing the second portion of the time slot comprises sending an announcement message to a remote device.

14. The article of claim 13, wherein the time slot is within a time division multiple access (TDMA) frame.

\* \* \* \* \*